United States Patent [19]
Wentworth

[11] Patent Number: 5,584,139
[45] Date of Patent: Dec. 17, 1996

[54] PORTABLE, COLLAPSIBLE CHAMBER FOR ASPHYXIATING TRAPPED ANIMALS

[76] Inventor: Jack W. Wentworth, 475 Ridge Rd., Webster, N.Y. 14580-1748

[21] Appl. No.: 568,191

[22] Filed: Dec. 6, 1995

[51] Int. Cl.$^6$ ............................................... A01M 13/00
[52] U.S. Cl. .................... 43/124; 43/125; 43/58
[58] Field of Search .................. 43/124, 125, 58; 119/496, 497

[56] References Cited

U.S. PATENT DOCUMENTS

| | | | |
|---|---|---|---|
| 1,743,660 | 1/1930 | Edwards | 43/125 |
| 2,079,458 | 5/1937 | Leichtfuss | 119/497 |
| 2,803,084 | 8/1957 | Frerking | 43/55 |
| 3,611,994 | 10/1971 | Bailey et al. | 119/496 |
| 3,900,983 | 8/1975 | Petrosky | 43/58 |
| 4,590,704 | 5/1986 | Volk | 43/61 |
| 4,787,170 | 11/1988 | Kingsbury et al. | 43/61 |
| 5,016,570 | 5/1991 | Henson | 119/497 |

FOREIGN PATENT DOCUMENTS 492737  5/1953  Canada ................................. 43/55

Primary Examiner—J. Elpel
Attorney, Agent, or Firm—Fred L. Denson

[57] ABSTRACT

A portable, collapsible chamber for asphyxiating trapped animals is described. The chamber is used in its canopy configuration and is transported and stored in its collapsed or folded configuration. When deployed in its canopy configuration, the chamber is placed over a trap that contains an animal in captivity. The animal is subjected to a lethal or immobilizing gas which is supplied to the chamber. The chamber includes front, back and end panels, each of which is hinged to an edge of a top panel. The panels are configured so that there gaps which function as gas vents between the end panels and the front and back panels. The front panel contains a gas inlet opening. The chamber optionally includes carrying handles, magnetic strips to help secure the chamber in its collapsed configuration and heat sensitive tape to sense the temperature of the chamber when gas is supplied to it.

8 Claims, 3 Drawing Sheets

PORTABLE, COLLAPSIBLE CHAMBER FOR ASPHYXIATING TRAPPED ANIMALS

BACKGROUND OF THE INVENTION

1. Field of the Invention

The present invention relates to a chamber for asphyxiating trapped animals. In particular, the invention provides an asphyxiation chamber which is portable, collapsible and conveniently connected to any source of an immobilizing or lethal gas.

2. Description of the Prior Art

Various types of traps for rodents and small animals such as squirrels, chipmunks, rabbits, ground hogs, raccoons, skunks and the like are well known in the art. Jaw traps and baited cage traps having trap door entrances are particularly well known. A typical cage trap is disclosed in U.S. Pat. No. 4,590,704 issued May 27, 1986 to Seymour A. Volk. According to this patent, an animal is drawn inside of a cage by bait placed on a movable floor of the cage. The weight of the animal causes the floor to move which in turn triggers movement of a series of connecting linkages which cause the entrance door to close and lock. While the patentee discusses the procedure for releasing animals that have been trapped by the patented device, he makes no mention of how trapped animals can conveniently be immobilized while they are still trapped. Disposing of trapped animals has become a problem because of various environmental and conservation regulations. Shooting such animals is dangerous and in some cases illegal, particularly in urban and suburban communities. Disposal by drowning is inhumane and presents contamination problems. Poison is another undesirable alternative since other wild life may have access to the poison.

Disposing of trapped animals by asphyxiation is a well known technique. Some traps are constructed so that the trapped animal suffocates from lack of an adequate supply of oxygen. A typical trap of this type is described in U.S. Pat. No. 4,787,170 issued Nov. 29, 1988 to Kingsbury et al. The use of this trap is limited by its size to trapping rodents. It also employs a slow and therefore inhumane method of asphyxiation, i.e. deprivation of oxygen.

U.S. Pat. No. 3,900,983 issued Aug. 26, 1975 to Petrosky describes a mobil gas chamber for rats wherein rats are baited, trapped and then subjected to the lethal exhaust fumes from a motor vehicle. This device is expensive and lacks versatility in that it is designed to only trap rats in metropolitan areas and it must be mounted on a truck.

Based on humane and safety considerations, it is generally more advantageous to use a cage trap than a jaw trap. Also, asphyxiation is the preferred means for disposing of trapped animals for safety, health and humane reasons. Asphyxiation is particularly advantageous because it kills parasites or other infestations that may be contained in the animal's coat. A major disadvantage to asphyxiation, however, is the inconvenience of supplying lethal gas to a trap, particularly when the trap is located in a relatively remote area. Traps having a source of lethal gas attached directly to the trapping device partially overcome this disadvantage. However, such traps can be cumbersome and expensive.

There is a need for humanely, safely, conveniently and economically disposing of trapped animals by asphyxiation at or near the place where they are trapped. There is also a need for humanely immobilizing trapped animals so that they can be transported to another location for either release or disposal.

It is therefore an object of this invention to provide a chamber for asphyxiating trapped animals that is inexpensive, safe, easily transportable and efficient.

It is a further object of this invention to provide a chamber for asphyxiating trapped animals that is usable with a wide variety of animal traps.

It is yet another object of this invention to provide a chamber for asphyxiating trapped animals that uses a range of immobilizing or lethal gases.

SUMMARY OF THE INVENTION

In accordance with the present invention, a portable, collapsible chamber for safely and conveniently asphyxiating trapped animals is provided. The chamber is used in its canopy configuration but is transported and stored in its folded or collapsed configuration. The chamber includes:

a. a top panel which has front, back and two side edges;

b. a front panel which has top, bottom and two side edges;

c. a back panel which has top, bottom and two side edges;

d. two end panels each having top, bottom and two side edges;

e. a gas inlet opening in the front panel; and f. gas outlet vents positioned between the end panels and the front and/or back panels.

The top panel is hinged to the front, back and two end panels. A hose or other suitable conduit for transporting an immobilizing or lethal gas from a source such as a motor vehicle exhaust pipe to the chamber is attached to the gas inlet opening in the front panel. The end panels are slightly narrower than the top panel so that a gap is created where the front panel meets each end panel and where the back panel meets each end panel. This gap functions as an exhaust vent and also facilitates folding the chamber into its collapsed configuration.

The chamber of the invention is simplistic, efficient, economical and easy to transport and store. It is usable with a variety of traps and provides a safe and humane way for asphyxiating trapped animals.

The invention and its objects and advantages will become more apparent by referring to the accompanying drawings and to the detailed description of the preferred embodiment.

DETAILED DESCRIPTION OF THE PREFERRED EMBODIMENTS

Figure 1A:
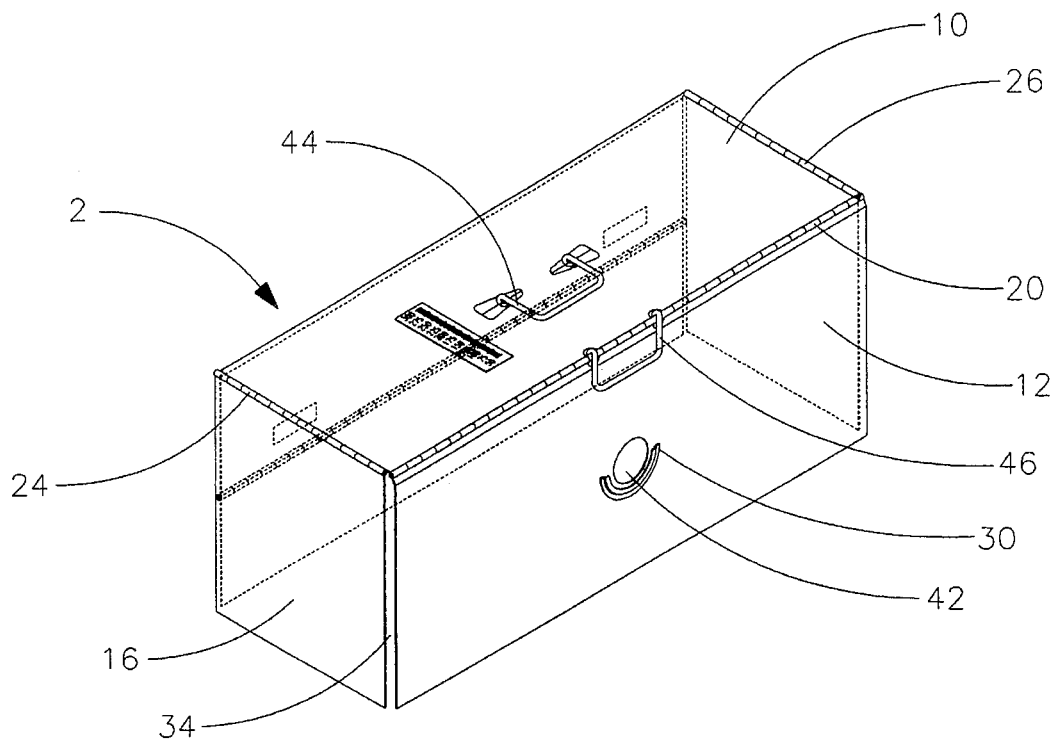
FIG. 1A is a front perspective view of the chamber of this invention in its canopy or open position.
Figure 1B:
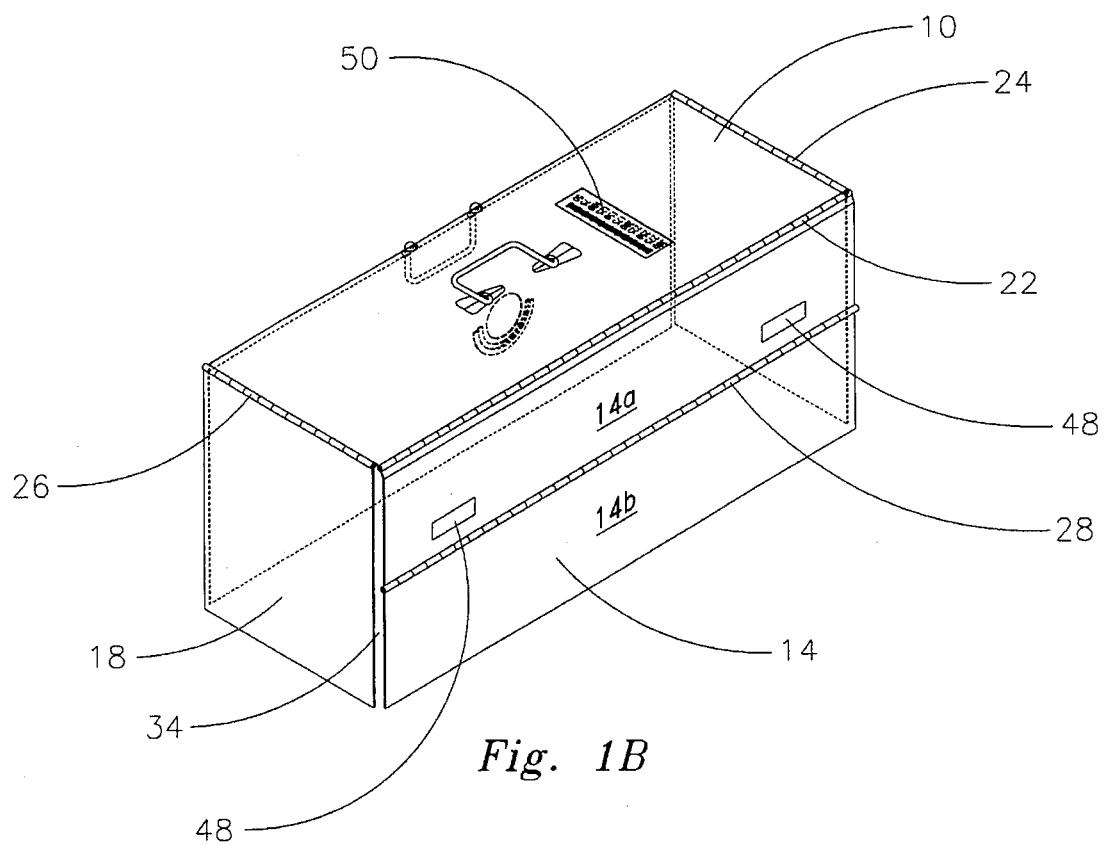
FIG. 1B is a rear perspective view of the chamber shown in FIG. 1A.

As shown in FIGS. 1A and 1B, the portable, collapsible chamber 2 of this invention, when in its canopy configuration, has top panel 10, front panel 12, back panel 14 and first and second end panels 16 and 18. Front panel 12 and top panel 10 are connected by hinge 20 positioned along the top edge of front panel 12 and the front edge of top panel 10. In a similar manner, back panel 14 and top panel 10 are connected by hinge 22 positioned along the top edge of back panel 14 and along the back edge of top panel 10. First and second end panels 16 and 18 are positioned on opposite sides of chamber 2 and each is connected to opposing side edges of top panel 10 by hinges 24 and 26 which are positioned along the top edges of sides 16 and 18 respectively. The top edge of each end panel 16 and 18 is shorter than each side edge of top panel 10. This dimensional difference creates gap 34 between each of end panels 16 and 18 and front panel 12 and back panel 14. Gap 34 serves as a gas outlet or exhaust vent for chamber 2. Gas inlet opening 42 is positioned in front panel 12. First handle 44 is centered on top panel 10 while second handle 46 is attached to top panel 10 near its front edge. Heat sensitive tape 50 is placed near handle 44 to sense the temperature of top panel 10 in the vicinity of the handle.

Figure 5:
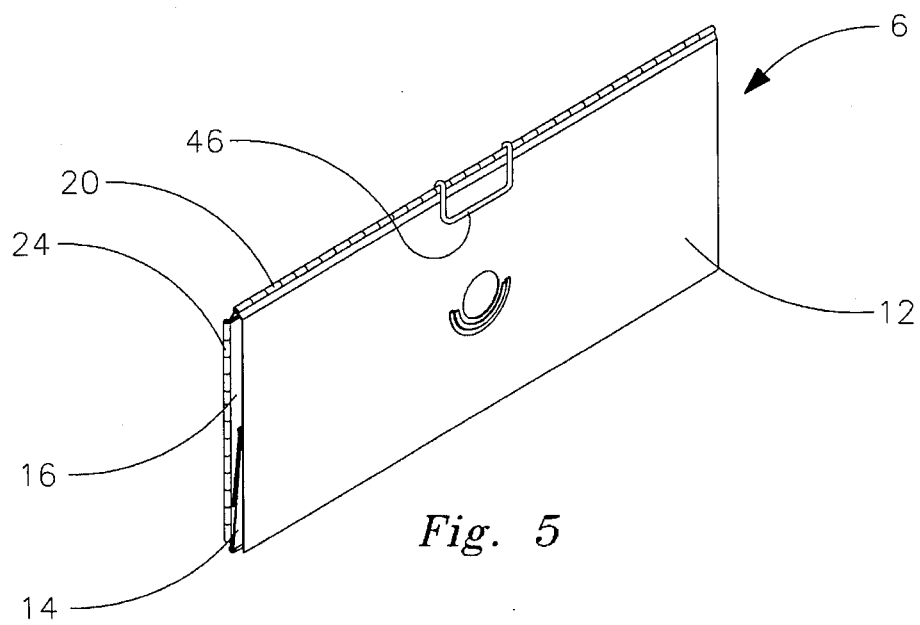
FIG. 5 is a perspective view of the chamber of the invention in its collapsed configuration.

As shown in FIG. 1B, back panel 14 contains upper part 14a and lower part 14b which are joined by hinge 28. Magnetic strips 48 are attached to upper part 14a to secure it to front panel 12 when chamber 6 is in its collapsed position as shown in FIG. 5.

Figure 2:
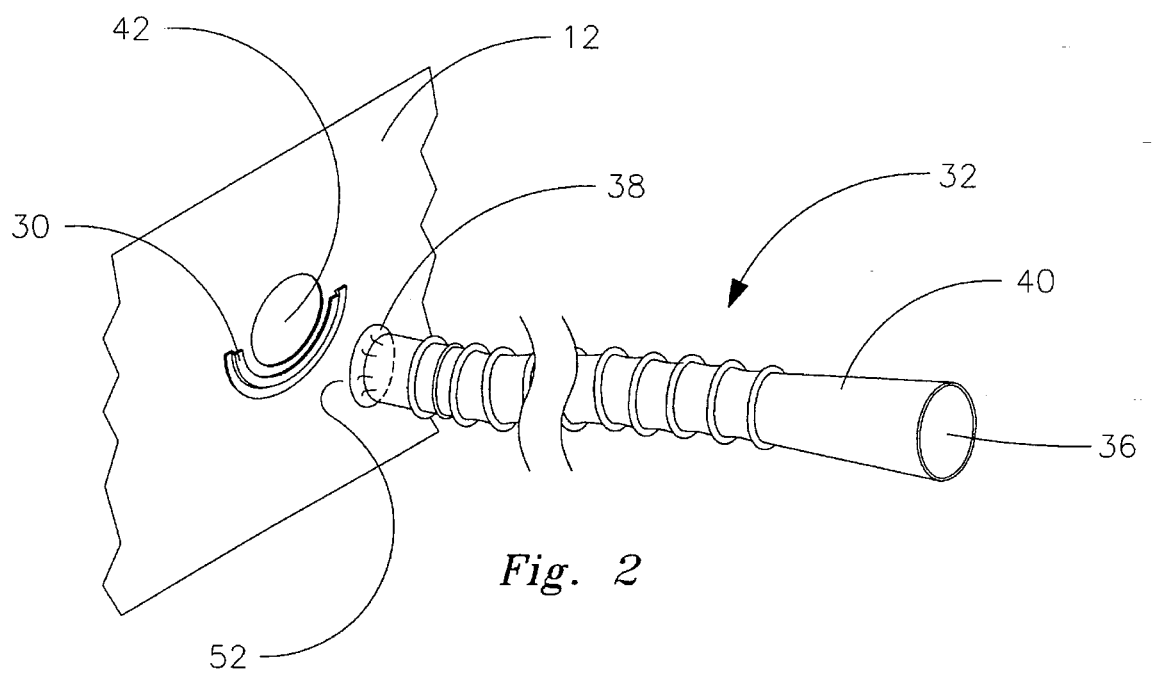
FIG. 2 is a partial view of the front panel of the chamber shown in FIG. 1A together with a perspective view of a hose that is attachable to the chamber.
Figure 3:
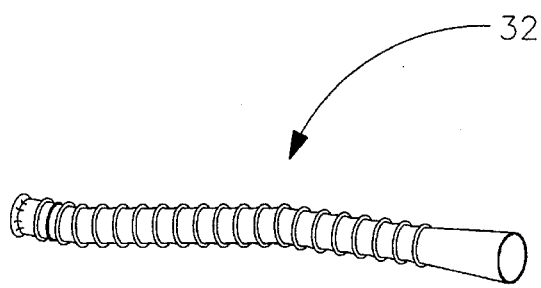
FIG. 3 is a perspective view of the hose shown in FIG. 2.

FIG. 2 shows that opening 42 in front panel 12 contains a trough-shaped collar connector 30 positioned along a lower portion of the periphery of the opening. Collar connector 30 is configured to mate in a quick disconnect manner with flange connector 38 positioned on the periphery of opening 52 at one end of hose 32. Hose 32 is attached to gas inlet opening 42 by seating flange connector 38 in the trough portion of collar connector 30. The remaining end of hose 32 contains opening 36 which is positioned in tapered connector 40. Tapered connector 40 is suitable for connection to a source of an asphyxiation gas such as the fumes from an automobile exhaust pipe.

Figure 4:
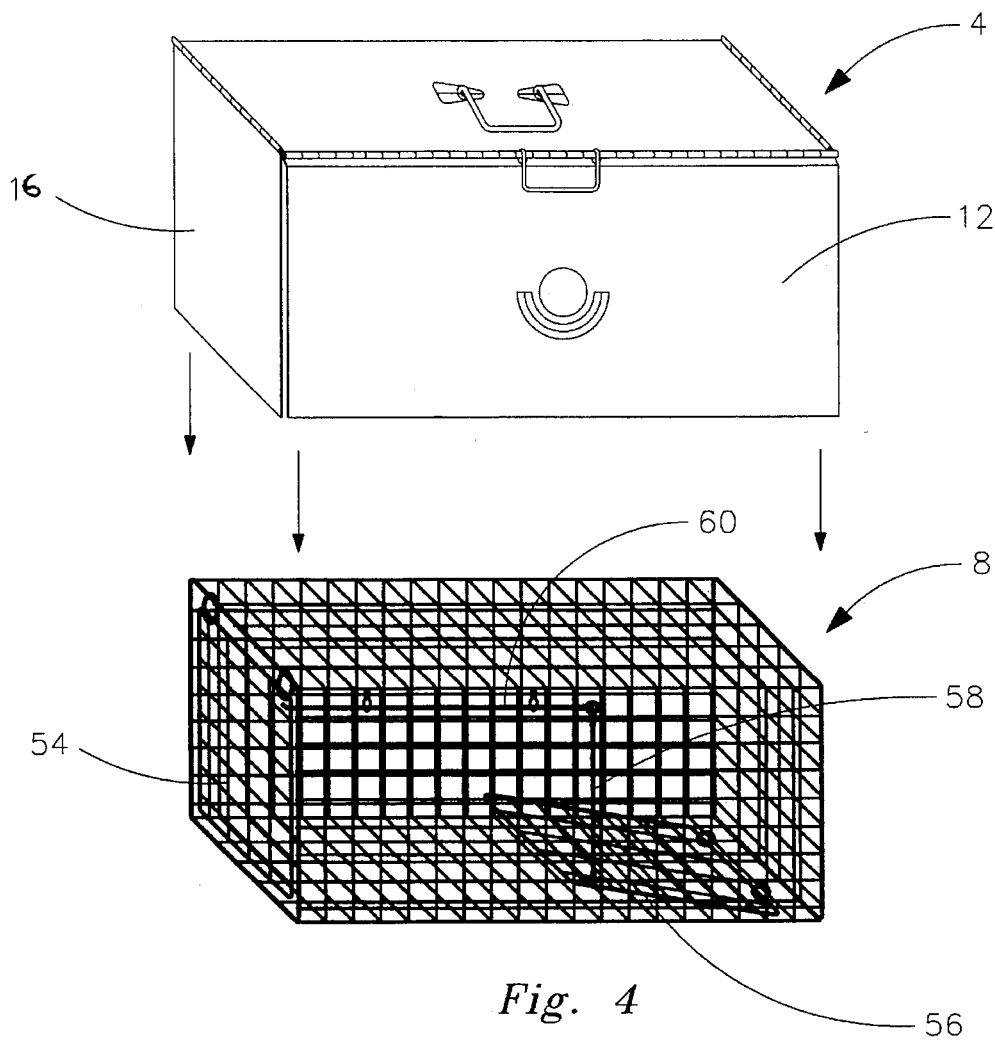
FIG. 4 is a perspective view of a cage trap as used with the chamber of the invention in its canopy position immediately prior to placement over the cage trap.

When chamber 4 is put to use, it is placed in its canopy configuration as shown in FIG. 4 over cage trap 8 which contains a trapped animal. Trap 8 contains entrance door 54 which is hinged from the top of the trap. Bait is placed on movable part 56 of the trap floor. When the animal's weight is applied to movable floor part 56, the floor moves downward which triggers corresponding movement of linkage arms 58 and 60 which in turn force entrance door 54 into a closed and locked position. A more detailed description of a typical cage trap useful with the chamber of this invention is contained in previously mentioned U.S. Pat. No. 4,590,704 to Seymour A. Volk.

Chamber 4 is canopied over trap 8 so that the bottom edge of front panel 12, back panel 14 and end panels 16 and 18 are each in contact with the ground or support member for trap 8. Hose 32 is then connected to gas inlet opening 42 by inserting flange connector 38 into the trough portion of collar connector 30. The remaining end of hose 32 is attached to a vehicle exhaust pipe by inserting the exhaust pipe into tapered connector 40 positioned at the end of hose 32. The vehicle's carbon monoxide containing exhaust gas is then permitted to enter the chamber through gas inlet opening 42 for a period of time sufficient to immobilize or asphyxiate the trapped animal. Ten to twenty minutes of exposure to exhaust fumes is usually a sufficient period of time to asphyxiate most small animals. Gaps 34 serve as exhaust vents to permit a small portion of exhaust fumes to escape. This enhances circulation and ensures an even distribution of the gas throughout the chamber. Venting the gas also protects against unwanted pressure build up in the chamber which adversely affects the operation of the motor vehicle's engine.

In an alternative embodiment, the height of the chamber in its canopy configuration is less than the height of the trap which it covers so that top panel 10 rests on the top of the trap. This creates a gap between the ground or support surface for the trap and the bottom edges of the front panel 12, back panel 14 and end panels 16 and 18. The gap serves as an additional vent to further enhance the circulation and distribution of the asphyxiating gas throughout the canopy and reduces the heat buildup in the chamber.

When the immobilization or asphyxiation process is completed, the chamber is removed and the animal disposed in a manner consistent with environmental regulations and practices. Because the chamber is heated by the exhaust gases when in use, the strip of heat sensitive tape 50 affixed near handle 44 on top panel 10 serves as a temperature gauge to indicate when handle 44 is cool enough to grasp.

Chamber 6 is transported and stored in its collapsed configuration as shown in FIG. 5. Chamber 6 is removed from its position over trap 8 by lifting it vertically using handle 44 until the bottom edges of the front, back and end panels clear the top of cage trap 8. End panels 16 and 18 are folded around hinges 24 and 26 so that each is positioned on the underside of top panel 10. Upper panel 14a and lower panel 14b of back panel are folded together at hinge 28. Thereafter, they are positioned at the backside of front panel 12 and secured to it by magnetic strips 48. Chamber 6 is then conveniently carried in its storage position by handle 46.

In addition to its use in asphyxiating trapped animals, chamber 4 is also useful in conjunction with trap 8 as a trap shader. In this embodiment, chamber 4 is canopied over trap 8 after the trap is set and baited but before the animal is trapped. End panel 16 is folded around hinge 24 and is positioned on the underside of top panel 10. It is supported in this position by the top of trap 8. In its set position, the trap entrance is the only exposed and visible part of trap 8. The use of a trap shader significantly reduces trapping time and increases trapping efficiency. After the animal enters trap 8, entrance door 54 is forced into its closed and locked position as previously described. When deployed as a trap shader, chamber 4 is also useful in transporting a trapped animal. After end panel 16 is unfolded to its open or canopied position, the trapped animal is transported with chamber 4 fully canopied over trap 8. If the trapped animal has not been asphyxiated when it is transported, the cover provided by chamber 4 helps to calm the animal while it is in transit. Also, whether in an asphyxiated or unasphyxiated condition, the trapped animal is not visible to others while it is being transported.

While the chamber described herein is constructed from any durable material, medium gauge galvanized sheet metal is particularly suitable. A light weight sheet metal such as aluminum is desirable, but steel sheet metal may also be used. When a non-ferrous metal or a composite synthetic material is used, magnetic strips 48 are secured to the upper part 14a of back panel 14 and to the backside of front panel 12 by a suitable adhesive material. The magnetic strips are positioned on upper part 14a so that they contact and adhere to correspondingly positioned magnetic strips on the backside of front panel 12.

The chamber may be of any size or shape so that it fits over the trap with which it is deployed in its canopy position. While the use of the chamber of this invention has been described with a particular type of cage trap, those skilled in the art will readily recognize that it may be used with any type of trap for capturing an animal without killing it. Moreover, the invention described herein is not limited to use with exhaust gases from motor vehicles. Instead, the chamber may be connected to any source of lethal gas or any other type of immobilizing non-lethal gaseous materials. Immobilizing gases include any gases which place the trapped animal in an inactive state and range from tranquilizing gases to lethal gases such as carbon monoxide.

The invention has been described in detail with reference to a preferred embodiment thereof. However, it will be understood that variation and modifications can be effected within the spirit and scope of the invention.

I claim:

1. A portable, collapsible chamber for asphyxiating animals, said chamber having:
   a. a top panel bounded by a front edge, a back edge and two side edges;
   b. a front panel bounded by a top edge, a bottom edge and two side edges, said front panel being hinged at its top edge to the front edge of the top panel;
   c. a back panel bounded by a top edge, a bottom edge and two side edges, said back panel being hinged at its top edge to the back edge of the top panel;
   d. a first end panel bounded by a top edge, a bottom edge and two side edges, said first end panel being hinged at its top edge to a side edge of the top panel, said top edge having a length which is less than the length of the side edge of the top panel;
   e. a second end panel bounded by a top edge, a bottom edge and two side edges, said second end panel being hinged at its top edge to the remaining side edge of the top panel, said top edge having a length which is less than the length of the remaining side edge of the top panel;
   f. a gas inlet opening positioned in the front panel; and
   g. at least one gas outlet vent positioned between an end panel and the front panel or the back panel.

2. The portable, collapsible chamber of claim 1 having at least one handle attached to the top panel.

3. The portable, collapsible chamber of claim 1 wherein the back panel contains an upper part and a lower part which are connected by a hinge.

4. The portable, collapsible chamber of claim 3 wherein the upper part has at least one magnetic strip attached thereto.

5. The portable, collapsible chamber of claim 1 having a heat sensitive tape attached to the top panel.

6. The portable, collapsible chamber of claim 1 including:
   a. a hose having an opening in one of its ends which is in communication with the gas inlet opening in the front panel and having an opening in its remaining end for placement in communication with a source of an asphyxiating gas;
   b. first means for connecting one end of said hose to the gas inlet opening in the front panel; and
   c. second means for connecting the remaining end of said hose to the source of an asphyxiating gas.

7. The portable, collapsible chamber of claim 6 wherein the first means for connecting one end of said hose to the gas inlet opening in the front panel is a quick disconnect flange-in-trough connector.

8. The portable, collapsible chamber of claim 1 in combination with an animal trap wherein the heights of the front panel, back panel and first and second end panels are less than the height of the trap so that a gap is created between the bottom edges of said front, back and end panels and a support surface when the chamber is placed over the trap to enhance circulation of an asphyxiating gas.

* * * * *